(12) United States Patent
Chitre et al.

(10) Patent No.: US 7,437,360 B1
(45) Date of Patent: Oct. 14, 2008

(54) SYSTEM AND METHOD FOR COMMUNICATION AND SYNCHRONIZATION OF APPLICATION-LEVEL DEPENDENCIES AND OWNERSHIP OF PERSISTENT CONSISTENCY POINT IMAGES

(75) Inventors: Amol R. Chitre, Sunnyvale, CA (US); Stephen L. Manley, Pleasanton, CA (US); Rimas Svarcas, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 455 days.

(21) Appl. No.: 10/777,887

(22) Filed: Feb. 12, 2004

Related U.S. Application Data

(60) Provisional application No. 60/531,853, filed on Dec. 23, 2003.

(51) Int. Cl.
*G06F 17/30* (2006.01)
(52) U.S. Cl. ........................................................ 707/8
(58) Field of Classification Search ................ 707/1, 707/2, 9, 10, 102; 709/213; 714/4
See application file for complete search history.

(56) References Cited

U.S. PATENT DOCUMENTS

| | | | |
|---|---|---|---|
| 5,748,870 A * | 5/1998 | Tims et al. ...................... 714/4 |
| 5,819,292 A | 10/1998 | Hitz et al. |
| 5,963,962 A | 10/1999 | Hitz et al. |
| 6,038,570 A | 3/2000 | Hitz et al. |
| 6,105,057 A * | 8/2000 | Kuftedjian et al. .......... 709/213 |
| 6,574,591 B1 | 6/2003 | Kleinman et al. |
| 6,889,228 B1 * | 5/2005 | Federwisch .................. 707/102 |
| 2002/0083037 A1 | 6/2002 | Lewis et al. |
| 2003/0182312 A1 | 9/2003 | Chen et al. |
| 2003/0182313 A1 | 9/2003 | Federwisch et al. |
| 2003/0182322 A1 | 9/2003 | Manley et al. |
| 2003/0182325 A1 | 9/2003 | Manley et al. |
| 2003/0182330 A1 | 9/2003 | Manley et al. |
| 2004/0030822 A1 | 2/2004 | Rajan et al. |

OTHER PUBLICATIONS

R. Fielding et al., Standards Track HTTP/1.1 RFC 2616, Network Working Group, Jun. 1999 pp. 1-143, The Internet Society.
Common Internet File System (CIFS) Version: CIFS-Spec 0.9, Draft SNIA CIFS work Group Work-In-Progress, Mar. 26, 2001, Storage Networking Industry Association.
D. Hitz et al., File System Design for an NFS File Server Appliance TR3002, pp. 1-10, Network Appliance, Inc.

* cited by examiner

*Primary Examiner*—Etienne P LeRoux
(74) *Attorney, Agent, or Firm*—Cesari and McKenna LLP

(57) ABSTRACT

A system and method for providing soft locks so applications can communicate their dependence upon PCPIs for a plurality of storage systems and applications. The soft locks, created and maintained by an application executing on one or more of the storage appliances, identify certain PCPIs that are to be retained by a storage appliance and its applications. An illustrative embodiment of this system and method is to use these soft locks to ensure that storage volume destinations along the cascaded chain of applications running on that or other storage systems retain the appropriate PCPI and state.

53 Claims, 11 Drawing Sheets

United States Patent

SYSTEM AND METHOD FOR COMMUNICATION AND SYNCHRONIZATION OF APPLICATION-LEVEL DEPENDENCIES AND OWNERSHIP OF PERSISTENT CONSISTENCY POINT IMAGES

RELATED APPLICATIONS

This application claims the benefit of U.S. Provisional Application Ser. No. 60/531,853, filed Dec. 23, 2003, entitled SYSTEM AND METHOD FOR PROVIDING SOFT LOCKS ON CASCADED MIRRORED VOLUMES, by Amol Chitre, et al., the teachings of which are expressly incorporated herein by reference.

This application is related to the following United States patent applications:

U.S. Pat. No. 6,889,228, entitled CASCADING SUPPORT FOR MIRRORED VOLUMES, by Michael Federwisch, the teachings of which are expressly incorporated herein by reference;

U.S. Pat. No. 7,225,204, entitled SYSTEM AND METHOD FOR ASYNCHRONOUS MIRRORING OF SNAPSHOTS AT A DESTINATION USING A PURGATORY DIRECTORY AND INODE MAPPING, by Stephen L. Manley, et al., the teachings of which are expressly incorporated herein by reference;

U.S. Pat. No. 7,043,485, entitled SYSTEM AND METHOD FOR STORAGE OF SNAPSHOT METADATA IN A REMOTE FILE, by Stephen L. Manley, et al., the teachings of which are expressly incorporated herein by reference;

U.S. Pat. No. 7,010,553, entitled SYSTEM AND METHOD FOR REDIRECTING ACCESS TO A REMOTE MIRRORED SNAPSHOT, by Raymond C. Chen, et al., the teachings of which are expressly incorporated herein by reference;

U.S. Pat. No. 7,007,046, entitled FORMAT FOR TRANSMISSION OF FILE SYSTEM INFORMATION BETWEEN A SOURCE AND A DESTINATION, by Stephen L. Manley, et al., the teachings of which are expressly incorporated herein by reference; and U.S. Pat. No. 6,933,539, entitled SYSTEM AND METHOD FOR DETERMINING CHANGES IN TWO SNAPSHOTS AND FOR TRANSMITTING CHANGES TO A DESTINATION SNAPSHOT, by Michael L. Federwisch, et al., the teachings of which are expressly incorporated herein by reference.

FIELD OF THE INVENTION

This invention relates to application-level dependencies in a storage system environment and, more particularly, to communicating and synchronizing application-level dependencies of persistent consistency point images across a plurality of storage systems.

BACKGROUND OF THE INVENTION

A storage appliance is a computer that provides file service relating to the organization of information on storage devices, such as disks. The file server (or filer) includes a storage operating system that implements a file system to logically organize the information as a hierarchical structure of directories and files on the disks. Each "on-disk" file may be implemented as a set of data structures, e.g., disk blocks, configured to store information. A directory, on the other hand, may be implemented as a specially formatted file in which information about other files and directories are stored.

A filer may be further configured to operate according to a client/server model of information delivery to thereby allow many clients to access files stored on a server, e.g., the filer. In this model, the client may comprise an application, such as a database application, executing on a computer that "connects" to the filer over a direct connection or computer network, such as a point-to-point link, shared local area network (LAN), wide area network (WAN), or virtual private network (VPN) implemented over a public network such as the Internet. Each client may request the services of the file system on the filer by issuing file system protocol messages (in the form of packets) to the filer over the network.

A common type of file system is a "write in-place" file system, an example of which is the conventional Berkeley fast file system. By "file system" it is meant generally a structuring of data and metadata on a storage device, such as disks, which permits reading/writing of data on those disks. In a write in-place file system, the locations of the data structures, such as inodes and data blocks, on disk are typically fixed. An inode is a data structure used to store information, such as metadata, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers in the inode, which may further reference indirect blocks that, in turn, reference the data blocks, depending upon the quantity of data in the file. Changes to the inodes and data blocks are made "inplace" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a filer is the Write Anywhere File Layout (WAFL™) file system available from Network Appliance, Inc. of Sunnyvale, Calif. The WAFL file system is implemented within a microkernel as part of the overall protocol stack of the filer and associated disk storage. This microkernel is supplied as part of Network Appliance's Data ONTAP™ software, residing on the filer, that processes file-service requests from network-attached clients.

As used herein, the term "storage operating system" generally refers to the computer-executable code operable on a computer that manages data access and may, in the case of a storage appliance, implement file system semantics, such as the Data ONTAP™ storage operating system that is implemented as a microkernel. The storage operating system can also be implemented as an application program operating over a general-purpose operating system, such as UNIX® or Windows NT®, or as a general-purpose operating system with configurable functionality, which is configured for storage applications as described herein.

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. In the example of a WAFL file system, a RAID 4 implementation is advantageously employed. This implementation specifically entails the striping of data across a group of disks, and separate parity caching within a selected disk of the RAID group. As described herein, a volume typically comprises at least one data disk and one associated parity disk (or possibly data/parity partitions in a single disk) arranged according to a RAID 4, or equivalent high-reliability, implementation.

In order to improve reliability and facilitate disaster recovery in the event of a failure of a filer, its associated disks or some portion of the storage infrastructure, it is common to "mirror" or replicate some or all of the underlying data and/or the file system that organizes the data. In one example, a mirror is established and stored at a remote site, making it more likely that recovery is possible in the event of a true disaster that may physically damage the main storage location or it's infrastructure (e.g. a flood, power outage, act of war, etc.). The mirror is updated at regular intervals, typically set by an administrator, in an effort to catch the most recent changes to the file system. Typically, the source system will create a snapshot, or persistent consistency point image (PCPI), of a volume to be mirrored. Snapshots, or PCPIs, described further below, are a point-in-time representation of the storage system, and more particularly, of the active file system, stored on a storage device (e.g., on disk) or in other persistent memory and having a name or other unique identifier that distinguishes it from other PCPIs taken at other points in time. The PCPI provides a point in time image to be mirrored to the destination system.

In certain installations, a primary system is mirrored to a secondary system which, in turn, is mirrored to a tertiary system. This mirroring to a second system to a third, etc. creates a "cascaded" chain of systems. As each of the systems may be mirroring to its backup on a different schedule, a need arises to assure, for example, that should the secondary system fail, the tertiary system may continue to generate coherent images of the file system from the primary. As such, the primary and tertiary systems need to maintain at least one PCPI in common. This need to maintain at least one PCPI in common to enable continued mirroring operations in the event of a failure or error condition may be complicated by differing backup schedules between, e.g., the primary and secondary or the secondary and tertiary systems. One option is to save each completed PCPI for each system for a predetermined period in order to provide a sufficient time frame for the next system in the cascaded system to obtain a mirrored image of the data. However, should any system within the cascaded system change its backup or mirroring schedule, the possibility exist for systems along the cascaded chain to lack a common PCPI, which may result in a potential loss of data as the storage systems would be unable to resume mirroring. Another noted problem of such an arrangement is that, if any system in the cascaded chain of systems performs backup mirroring at a high frequency, e.g., every 15 minutes, then that backing-up system may generate and store a multitude of PCPIs which serve to reduce available disks space.

Another noted disadvantage occurs when, for example, a dump program is utilized to transfer a PCPI stored on one of the cascaded systems to offline storage, such as tape, for archival and/or disaster recovery purposes. In such situations, a mirroring program may complete its mirroring operation and delete a PCPI while the tape dump program still requires access to the PCPI for backup purposes. If the PCPI is deleted before the tape dump completes, the tape image may be incomplete and/or corrupted.

More generally, multiple applications that depend on various PCPIs stored across a number of storage systems require a technique for communicating their dependencies to other applications. These dependencies include when an application has a dependency on a PCPI that spans across multiple storage systems when, for example, the PCPI has mirrored.

SUMMARY OF THE INVENTION

The disadvantages of the prior art are overcome by providing a system and method for implementing a system-independent, application-generic, application-controlled and accessible mechanism for establishing references to, ownership of, or dependence upon a set of PCPIs. In accordance with the novel system and method, the dependencies can be synchronized among a plurality of storage systems that have an interest in the PCPIs. The soft locks are implemented by the use of data structures created and monitored by various application programs and are not respected by the file systems, i.e. the file system may delete a soft locked PCPI.

An exemplary implementation of a soft lock is in a cascaded mirror. Utilizing soft locks, the dependencies between downstream cascaded mirrors can be synchronized with the upstream mirrors. During each mirroring operation, the mirroring application executing on the downstream system sends a list of soft locks that already exist for certain PCPIs located on that system to the upstream system. The mirroring application executing on the upstream system receives these soft locks and sets them for the corresponding PCPIs located on that system. At the conclusion of each mirroring operation, the mirroring application executing on the upstream system sets soft locks for the latest PCPIs that were transferred to the downstream system. Thus, soft locks are synchronized in a cascaded chain of mirrored systems as each individual system completes its mirroring operation. Similarly, during a mirroring operation, if a PCPI is no longer needed, for example when both the upstream and downstream systems share a newer common PCPI, the mirroring application may delete the soft lock. Such deletion is propagated through the chain of cascaded mirrored systems in the same manner as propagation of the creation of soft locks.

The soft locks also permit non-mirroring application software to lock a necessary PCPI. For example, a tape backup program may soft lock a PCPI that it is transferring to tape. While the softlock is in place, applications that respect soft locks, e.g., mirroring, will not delete the PCPI nor trigger any operation that may lead to the elimination of the PCPI. Once the backup to tape is complete, the tape backup program will release the softlock on the PCPI.

Utilizing soft locks in an illustrative cascaded mirror environment permits any system to continue a mirror relationship if the cascaded configuration is altered. This alteration can include removing a system in the cascaded chain or reconfiguring the order is in which machines are mirrored. Regardless of reconfiguration, all mirrors will continue to interoperate because each system in the cascaded mirror shares common soft locks and PCPIs.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Persistent Consistency Point Images and Mirroring

As noted above, in certain mirroring environments, snapshots are created to provide a point in time representation of data to be mirrored. Snapshots are further described in TR3002 *File System Design for an NFS File Server Appliance* by David Hitz et al., published by Network Appliance, Inc., and in U.S. Pat. No. 5,819,292 METHOD FOR MAINTAINING CONSISTENT STATES OF A FILE SYSTEM AND FOR CREATING USER-ACCESSIBLE READ-ONLY COPIES OF A FILE SYSTEM by David Hitz et al., which are hereby incorporated by reference. The term "Snapshot" is a trademark of Network Appliance, Inc. It is used for purposes of this patent to designate a persistent consistency point (CP) image. A persistent consistency point image (PCPI) is a point-in-time representation of the storage system, and more particularly, of the active file system, stored on a storage device (e.g., on disk) or in other persistent memory and having a name or other unique identifier that distinguishes it from other PCPIs taken at other points in time. A PCPI can also include other information (metadata) about the active file system at the particular point in time for which the image is taken. Note that the terms "PCPI" and "Snapshot™" may be used interchangeably throughout this patent without derogation of Network Appliance's trademark rights.

Figure 1:
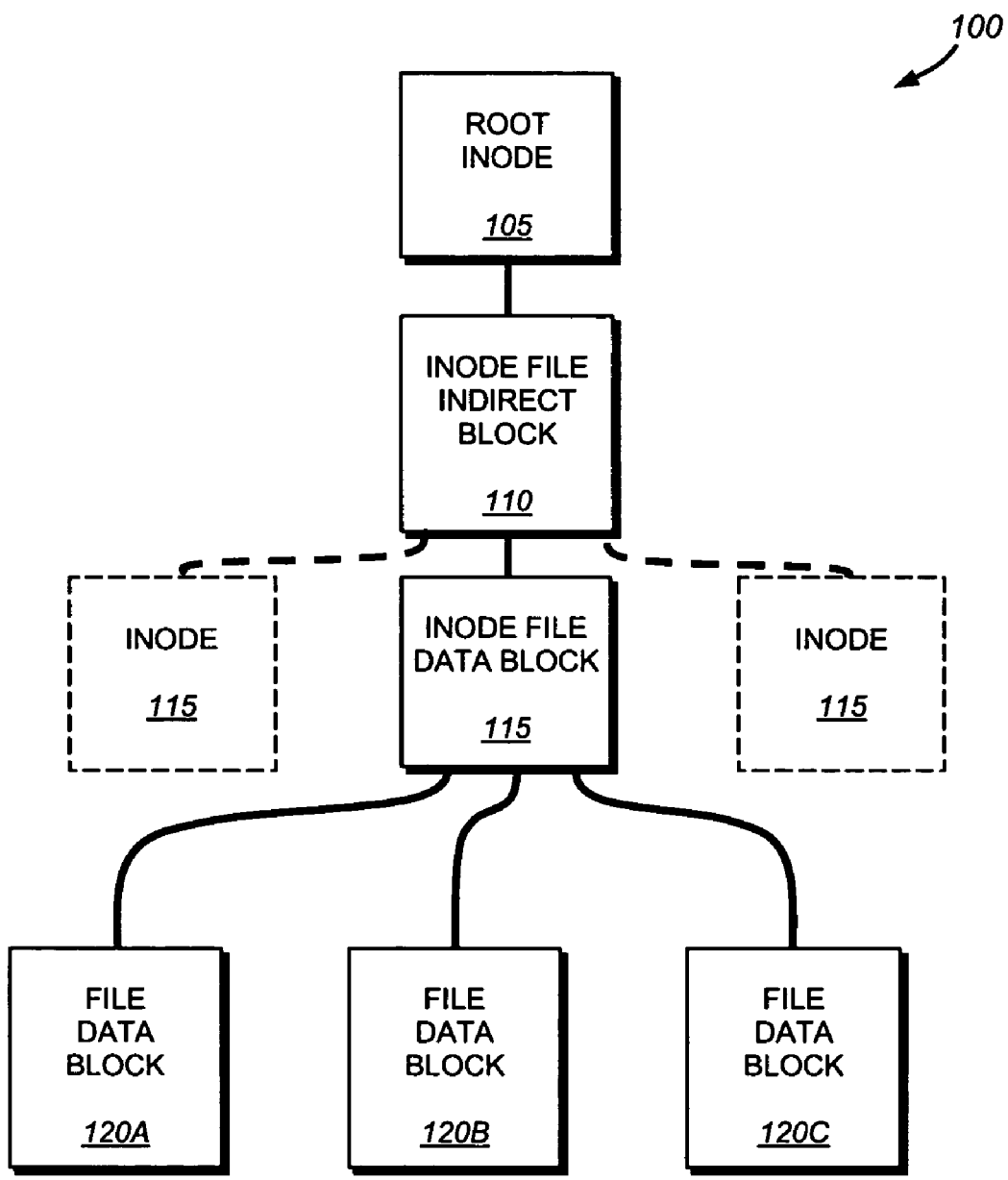
FIG. 1 is schematic block diagram of an exemplary file system inode structure about to undergo a PCPI procedure according to the prior implementation.

A PCPI is a restorable version of a file system created at a predetermined point in time. PCPIs are generally created on some regular schedule. The PCPI is stored on-disk along with the active file system, and is called into the buffer cache of the storage appliance memory as requested by the storage operating system. An exemplary file system data identifier buffer tree structure (using inodes in this example—but other forms of block and data identifiers can be employed) 100 is shown in FIG. 1. Over the exemplary tree structure may reside a file system information block (not shown). The root inode 105 contains information describing the inode file associated with a given file system. In this exemplary file system inode structure root inode 105 contains a pointer to the inode file indirect block 110. The inode file indirect block 110 contains a set of pointers to inode file and data blocks 115. The inode file data block 115 includes pointers to file and data blocks to 120A, 120B and 120C. Each of the file data blocks 120(A-C) is capable of storing, in the illustrative embodiment, 4 kilobytes (KB) of data. Note that this structure 100 is simplified, and that additional layers of data identifiers can be provided in the buffer tree between the data blocks and the root inode as appropriate.

Figure 2:
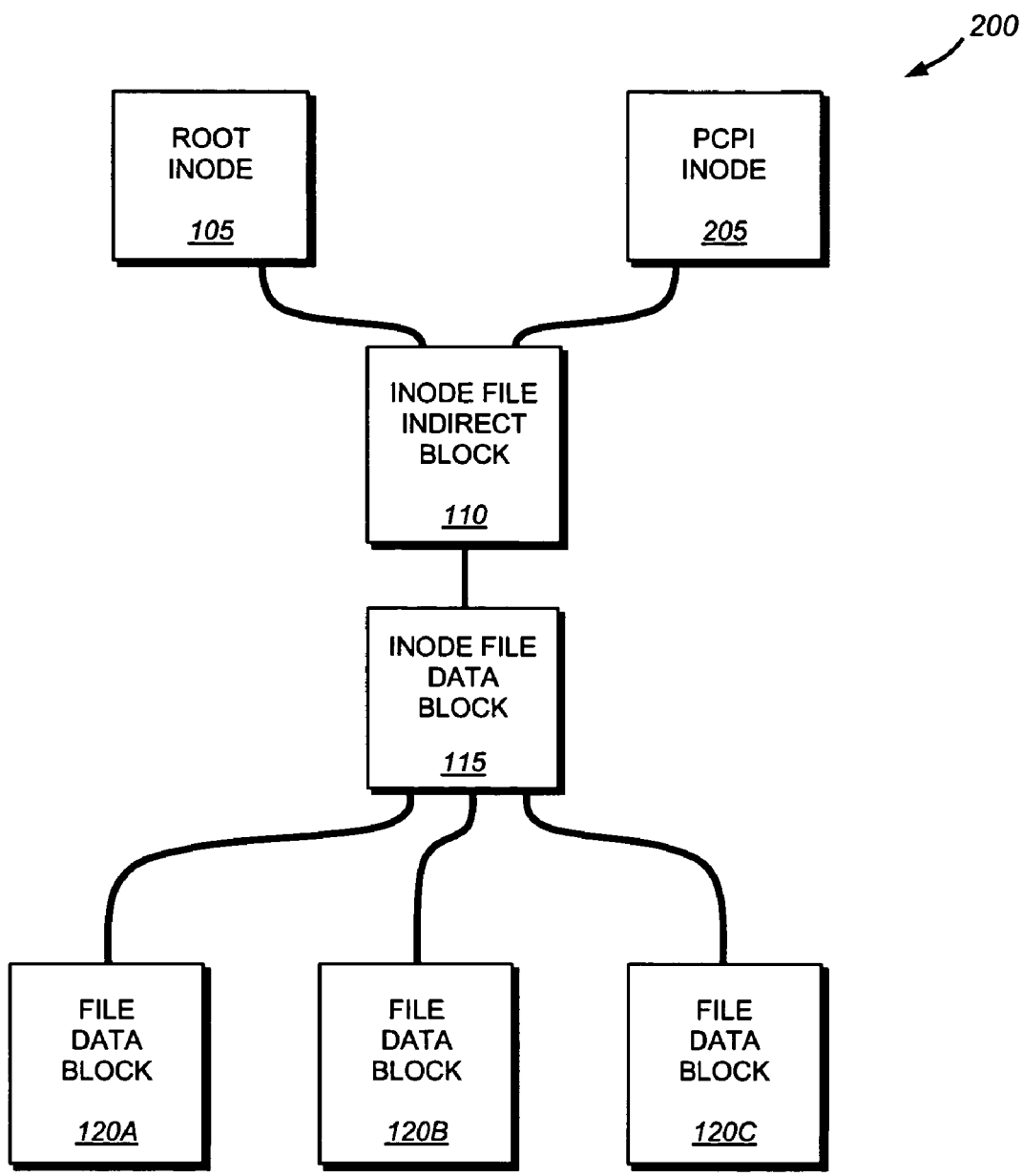
FIG. 2 is a schematic block diagram of the exemplary file system inode structure of FIG. 1 including a PCPI inode, according to a prior implementation.

When the file system generates a PCPI of a given file system, a PCPI inode 205 is generated as shown in FIG. 2. The PCPI inode 205 is, in essence, a duplicate copy of the root inode 105 of the data structure (file system) 100. Thus, the exemplary structure 200 includes the same inode file indirect block 110, inode file data block(s) 115 and file data blocks 120A-C as in FIG. 1. When a user modifies a file data block, the file system layer writes the new data block to disk and changes the active file system to point to the newly created block.

Figure 3:
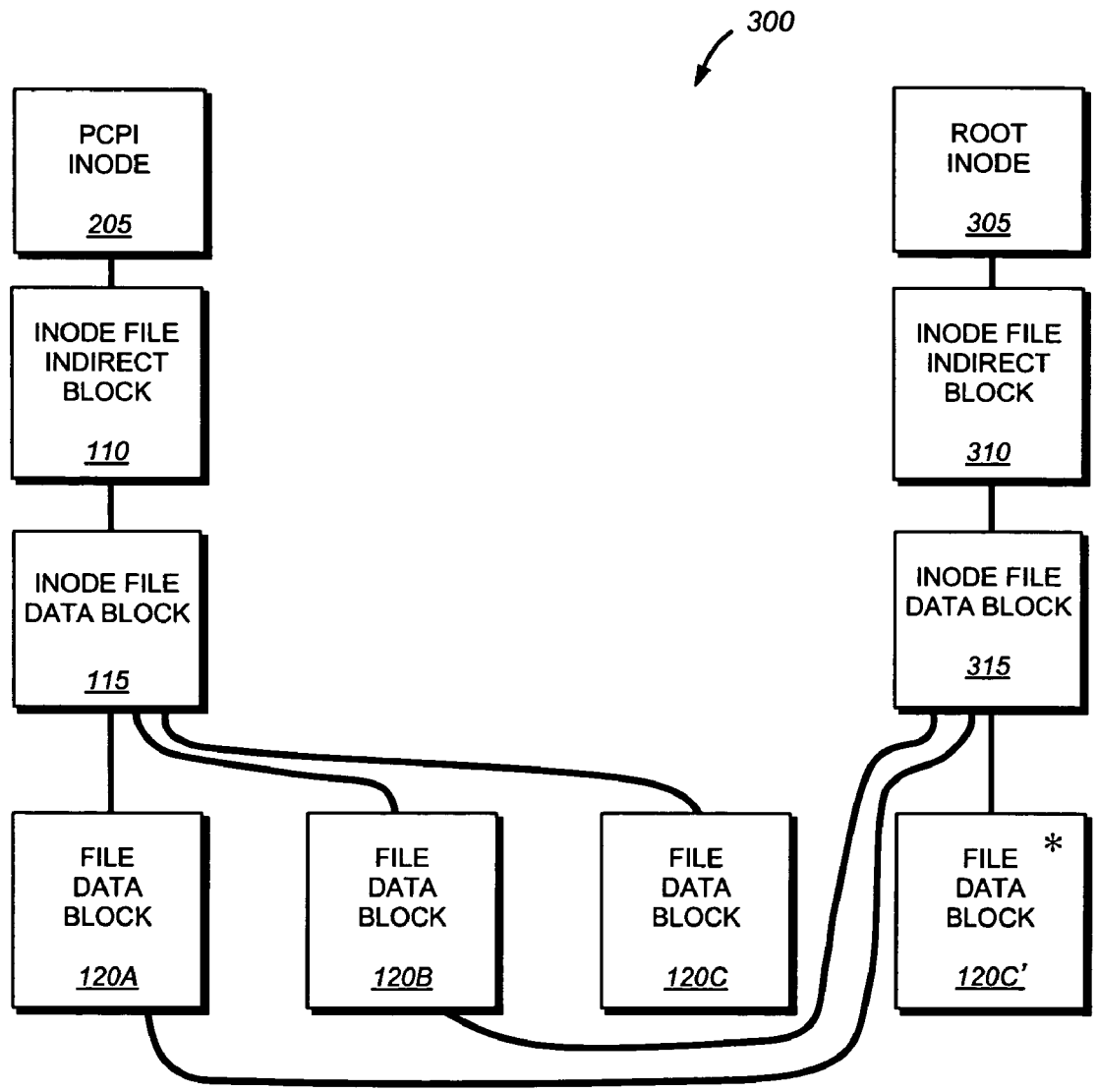
FIG. 3 is a schematic block diagram of an exemplary file system inode structure of FIG. 1 after data block has been rewritten, according to a prior implementation.

FIG. 3 shows an exemplary data structure 300 after a file data block has been modified. In this illustrative example, file data block 120C was modified to file data block 120C'. When file data block 120C is modified file data block 120C', the contents of the modified file data block are written to a new location on disk as a function for the exemplary file system. Because of this new location, the inode file data block 315 pointing to the revised file data block 120C must be modified to reflect the new location of the file data block 120C. Similarly, the inode file indirect block 310 must be rewritten to point to the newly revised inode file and data block. Thus, after a file data block has been modified the PCPI inode 205 contains a pointer to the original inode file system indirect block 110 which in turn contains a link to the inode file data block 115. This inode file data block 115 contains pointers to the original file data blocks 120A, 120B and 120C. However, the newly written inode file data block 315 includes pointers to unmodified file data blocks 120A and 120B. The inode file data block 315 also contains a pointer to the modified file data block 120C' representing the new arrangement of the active file system. A new file system root inode 305 is established representing the new structure 300. Note that metadata (not shown) stored in any Snapshotted blocks (e.g., 205, 110, and 120C) protects these blocks from being recycled or overwritten until they are released from all PCPIs. Thus, while the active file system root inode 305 points to new blocks 310, 315 and 120C', the old blocks 205, 110, 115 and 120C are retained until the PCPI is fully released.

After a PCPI has been created and file data blocks modified, the file system layer can reconstruct or "restore" the file system inode structure as it existed at the time of the snapshot by accessing the PCPI inode. By following the pointers contained in the PCPI inode 205 through the inode file indirect block 110 and inode file data block 115 to the unmodified file data blocks 120A-C, the file system layer can reconstruct the file system as it existed at the time of creation of the snapshot.

In mirroring, the above-described PCPI is transmitted as a whole, over a network (such as the well-known Internet) to the remote storage site. Generally, a PCPI is an image (typically read-only) of a file system at a point in time, which is stored on the same primary storage device as is the active file system and is accessible by users of the active file system. Note, that by "active file system" it is meant the file system to which current input/output (I/O) operations are being directed. The primary storage device, e.g., a set of disks, stores the active file system, while a secondary storage, e.g. a tape drive, may be utilized to store backups of the active file system. Once Snapshotted, the active file system is reestablished, leaving the imaged version in place for possible single-file or disaster recovery. Each time a PCPI occurs, the active file system as it existed becomes the new PCPI while the active file system carries on recording any new changes. A set number of PCPIs may be retained depending upon various time-based and other criteria. The Snapshotting process is described in further detail in U.S. patent application Ser. No. 09/932,578, entitled INSTANT SNAPSHOT by Blake Lewis et al., which is hereby incorporated by reference as though fully set forth herein.

Figure 4:
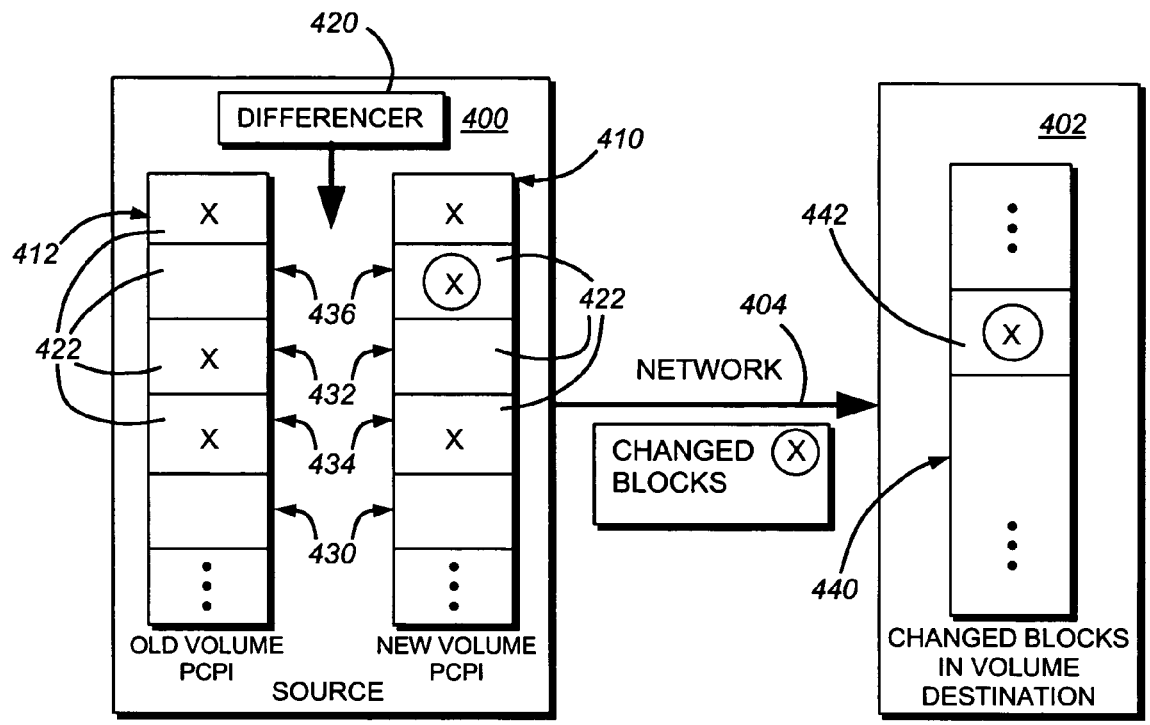
FIG. 4 is a schematic block diagram of an exemplary remote mirroring of a volume file system from a source file server to a destination file server over a network according to a prior implementation.

The complete recopying of the entire file system to a remote (destination) site over a network may be quite inconvenient where the size of the file system is measured in tens or hundreds of gigabytes (even terabytes). This full-backup approach to remote data mirroring or replication may severely tax the bandwidth of the network and also the processing capabilities of both the destination and source filer. One solution has been to limit the replica to only portions of a file system volume that have experienced changes. Hence, FIG. 4 shows volume-based mirroring/replication procedure where a source file system 400 is connected to a destination storage site 402 (consisting of a server and attached storage—not shown) via a network link 404. The destination 402 receives periodic mirror/replica updates at some regular interval set by an administrator. These intervals are chosen based upon a variety of criteria including available bandwidth, importance of the data, frequency of changes and overall volume size.

Figure 5:
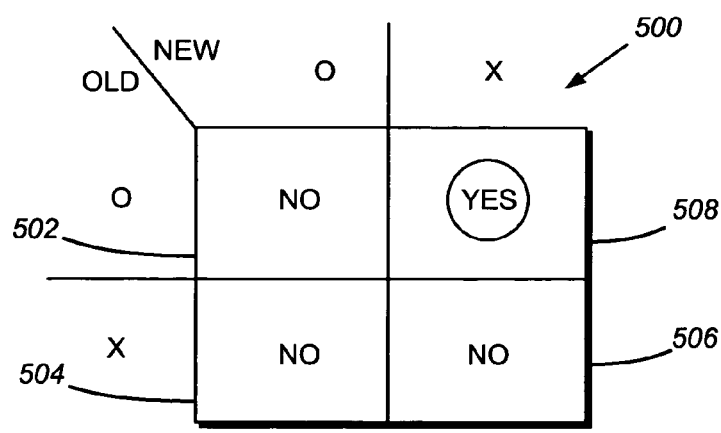
FIG. 5 is a decision table used by a block differencer of FIG. 4 for determining whether a change in a block is to be transmitted from the source file server to the destination file server according to a prior implementation.

In brief summary, the source creates a pair of discrete time-separated PCPIs of the volume. These can be created as part of the commit process in which data is committed to non-volatile memory in the filer or by another mechanism. The "new" PCPI 410 is a recent PCPI of the volume's active file system. The "old" PCPI 412 is an older PCPI of the volume, which should match the image of the file system mirrored/replicated on the destination mirror. Note that the file server is free to continue work on new file service requests once the new PCPI 412 is made. The new PCPI acts as a checkpoint of activity up to that time rather than an absolute representation of the then-current volume state. A differencer 420 scans the blocks 422 in the old and new PCPIs. In particular, the differencer works in a block-by-block fashion, examining the list of blocks in each PCPI to compare which blocks have been allocated. In the case of a write-anywhere system, the block is not reused as long as a PCPI references it, thus a change in data is written to a new block. Where a change is identified (denoted by a presence or absence of an 'X' designating data), a decision process 500 shown in FIG. 5, in the differencer 420 decides whether to transmit the data to the destination 402. The decision process 500 compares the old and new blocks as follows: (a) where data is in neither an old nor new block (case 502) as in old/new block pair 430, no data is available to transfer; (b) where data is in the old block, but not the new (case 504) as in old/new block pair 432, such data has already been transferred, (and any new destination PCPI pointers will ignore it), so the new block state is not transmitted; (c) where data is present in the both the old block and the new block (case 506) as in the old/new block pair 434, no change has occurred and the block data has already been transferred in a previous PCPI; and (d) finally, where the data is not in the old block, but is in the new block (case 508) as in old/new block pair 436, then a changed data block is transferred over the network to become part of the changed volume mirror/replica set 440 at the destination as a changed block 442. In the exemplary write-anywhere arrangement, the changed blocks are written to new, unused locations in the storage array. Once all changed blocks are written, a base file system information block, that is the root pointer of the new PCPI, is then committed to the destination. The transmitted file system information block is committed, and updates the overall destination file system by pointing to the changed block structure in the destination, and replacing the previous file system information block. The changes are at this point committed as the latest incremental update of the destination volume mirror. This file system accurately represents the "new" mirror on the source. In time a new "new" mirror is created from further incremental changes.

Approaches to volume-based remote mirroring of PCPIs are described in detail in commonly owned U.S. Pat. No. 6,604,118, entitled FILE SYSTEM IMAGE TRANSFER by Steven Kleiman, et al. and U.S. Pat. No. 6,574,591, entitled FILE SYSTEM IMAGE TRANSFER BETWEEN DISSIMILAR FILE SYSTEMS by Steven Kleiman, et al., both of which are expressly incorporated herein by reference.

This volume-based approach to incremental mirroring from a source to a remote storage destination is effective, but in some circumstances it may be desirable to replicate less than an entire volume structure. The volume-based approach typically forces an entire volume to be scanned for changes and those changes to be transmitted on a block-by-block basis. In other words, the scan focuses on blocks without regard to any underlying information about the files, inodes and data structures, which the blocks comprise. The destination is organized as a set of volumes so a direct volume-by-volume mapping is established between source and destination. Where a volume may contain a terabyte or more of information, the block-by-block approach to scanning and comparing changes may still involve significant processor overhead and associated processing time. Often, there may have been only minor changes in a sub-block beneath the root inode block being scanned. Since a list of all blocks in the volume is being examined, however, the fact that many groupings of blocks (files, inode structures, etc.) are unchanged is not considered. In addition, the increasingly large size and scope of a full volume make it highly desirable to sub-divide the data being mirrored into sub-groups such as qtrees, because some groups are more likely to undergo frequent changes, it may be desirable to update their PCPIs/Snapshots™ more often than other, less-frequently changed groups. In addition, it may be desirable to mingle original and imaged (Snapshotted) sub-groups in a single volume and migrate certain key data to remote locations without migrating an entire volume.

One such sub-organization of a volume is the well-known qtree. Qtrees, as implemented on an exemplary storage system such as described herein, are subtrees in a volume's file system. One key feature of qtrees is that, given a particular qtree, any file or directory in the system can be quickly tested for membership in that qtree, so they serve as a good way to organize the file system into discrete data sets. The use of qtrees as a source and destination for replicated data may be desirable. An approach to remote asynchronous mirroring of a qtree is described in U.S. Pat. No. 6,993,539 entitled SYSTEM AND METHOD FOR DETERMINING CHANGES IN TWO SNAPSHOTS AND FOR TRANSMITTING CHANGES TO A DESTINATION SNAPSHOT, by Michael L. Federwisch, et al., the teachings of which are expressly incorporated herein by reference.

Because the above-described mirroring approaches are asynchronous, they occur at a point in time that may occur after the actual making of the PCPI, and may occur intermittently. This alleviates undue taxing of network bandwidth, allowing the changed information to be transferred to the remote destination as bandwidth is available. A series of checkpoints and other standard transmission reference points can be established in both the source and destination to ensure that, in the event of any loss of transmission of change data across the network, the mirror update procedure can be reconstructed from the last successful transmission.

B. Cascaded Storage System Environment

Figure 6:
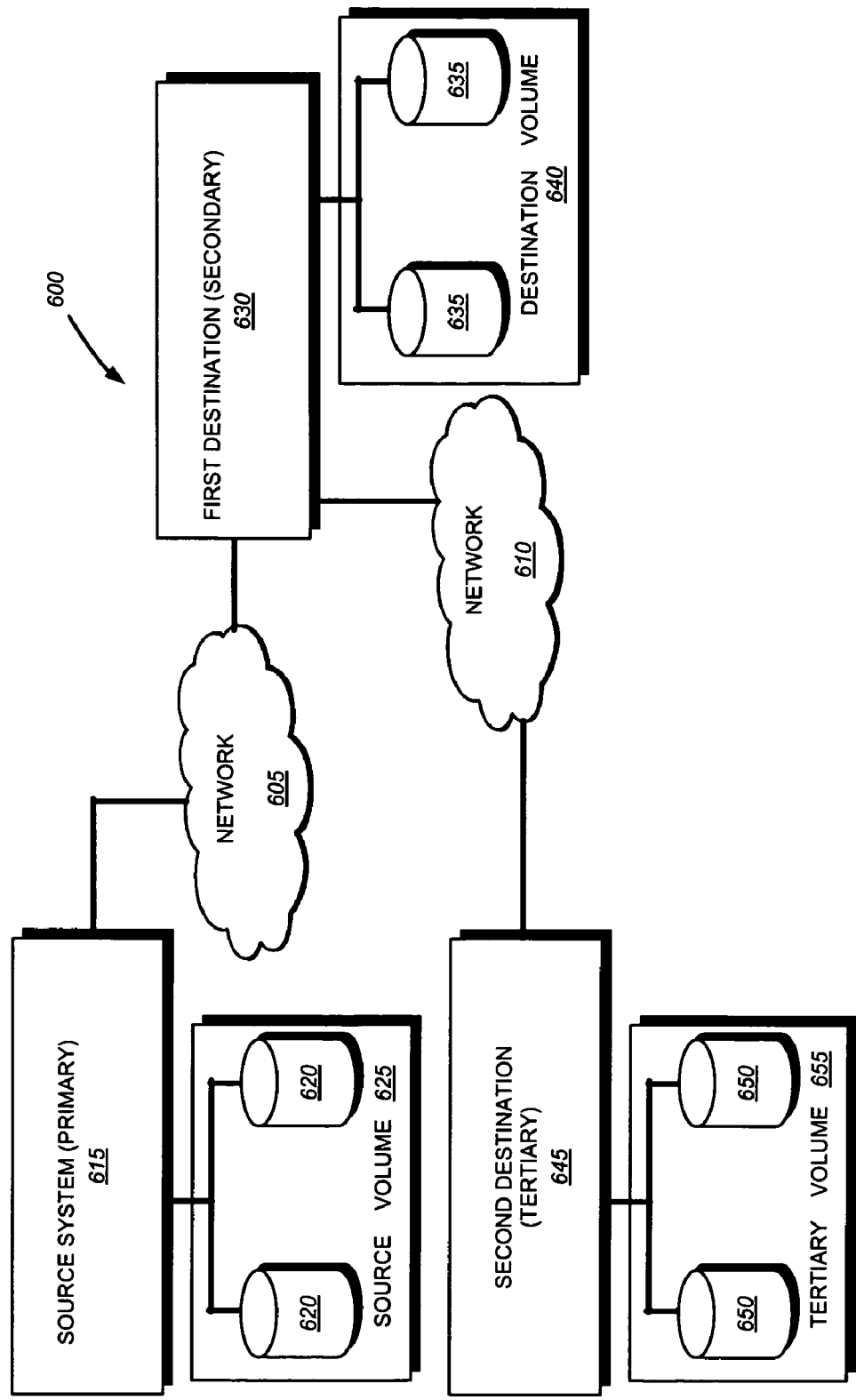
FIG. 6 is a schematic block diagram of an exemplary cascaded network in accordance with an embodiment of the present invention.

By way of further background, FIG. 6 is a schematic block diagram of a cascaded mirrored storage system environment 600 that includes a chain of cascaded computers (storage appliances in this example) including a source system 615, a first destination system 630 and a second destination 645 that may be advantageously used with the teachings of the present invention.

The source 615 (or primary) system is interconnected with a source volume 625 comprising a plurality of storage devices, such as disks 620. The source system is connected to a first destination 630 (or secondary) system, via network 605. The first destination system 630 includes a destination volume 640 comprised of disks 635. The first destination system 630 is also connected to a second destination 645 (or tertiary) system via network 610. The second destination (or tertiary) system 645 includes a tertiary volume 655 comprised of disks 650. It should be noted that in alternate embodiments, a fourth, fifth or additional systems may be linked into the cascaded chain of systems. Also in alternate embodiments, network 605 and network 610 may comprise the same network such as, for example, the well-known Internet. Also in alternate embodiments, there may be redundant data paths between each of the systems in the cascaded chain of systems.

In the exemplary embodiment, the source volume 625 is mirrored to the destination volume 640 via network 605. Similarly, the destination volume 640 is mirrored over network 610 to the tertiary volume 655. It should be noted that the tertiary volume may be further cascaded and mirrored to yet another volume. However, for the purpose of this description, only three cascaded systems are described. However, the principles of the present invention may be directed to systems of varying sizes and having n layers of cascade mirroring.

In the illustrative embodiment, the source volume 625 is mirrored to the destination volume using a qtree-based mirroring technique, such as that described in the above-incorporated patent application entitled SYSTEM AND METHOD FOR DETERMINING CHANGES IN TWO SNAPSHOTS AND FOR TRANSMITTING CHANGES TO A DESTINATION SNAPSHOT, by Michael L. Federwisch, et al. Also, in the illustrative embodiment, the mirroring operations between the secondary and tertiary (and any additional systems in a cascaded chain of mirrored systems) are performed using a volume-based mirroring, such as that described in the above-incorporated patent applications entitled FILE SYSTEM IMAGE TRANSFER, by Stephen Kleiman, et al., and FILE SYSTEM IMAGE TRANSFER BETWEEN DISSIMILAR FILE SYSTEMS, by Stephen Kleiman, et al. However, it should be noted that the technique of the present invention may be utilized with any acceptable mirroring technique that may be suitably modified to utilize the teachings of the present invention.

Figure 7:
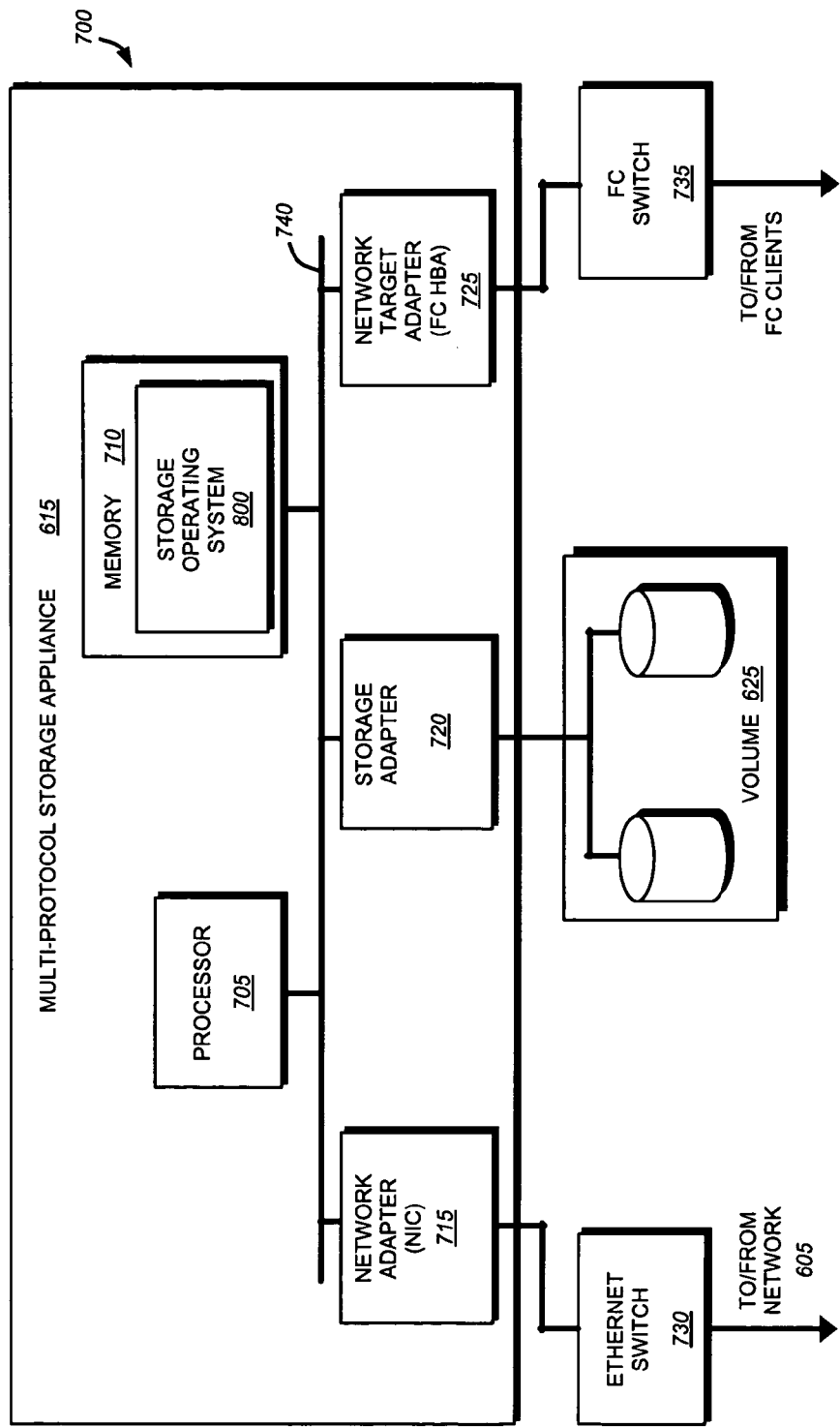
FIG. 7 is a schematic block diagram of an exemplary multi protocol storage appliance in accordance with an embodiment of the present invention.

FIG. 7 is a schematic block diagram of one of the exemplary storage systems of FIG. 6 (primary storage system 615) in accordance with an embodiment of the present invention. The storage system 700 is illustratively embodied as a storage appliance 615 comprising a processor 705, a memory 710, a plurality of network adapters 715 and 720 and a storage adapter 720 interconnected by a system bus 740. The terms "storage system" and "storage appliance" are thus used interchangeably. The storage appliance 615 also includes, within memory 710, a storage operating system 800 that manages data access and may logically organize the information as hierarchical structures of directories, files and virtual disks (vdisks) on the disks.

In the illustrative embodiment, the memory 710 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 800, portions of is which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the inventive system and method described herein.

Each network adapter 715, 725 may comprise a network interface card (NIC) or host bus adapter (NIC) having the mechanical, electrical, and signaling circuitry needed to couple the storage appliance to an Ethernet or Fibre Channel (FC) switch 730, 735. Each NIC may include an interface that is assigned one or more IP addresses along with one or more media access control (MAC) addresses. Clients of the storage appliance communicate with the storage appliance by sending packet requests for information to these addresses in accordance with a predefined protocol, such as TCP/IP.

The storage adapter 720 cooperates with the storage operating system 800 executing on the storage appliance to access information requested by the clients. The information may be stored on the disks or other similar media adapted to store information. The storage adapter includes input/output (I/O) interface circuitry that couples to the disks over an I/O interconnect arrangement, such as a conventional high-performance, FC serial link or loop topology. The information is retrieved by the storage adapter and, if necessary, processed by the processor 705 (or the adapter 720 itself) prior to being forwarded over the system bus 740 to the network adapters 715, 725, where the information is formatted into appropriate protocol packets and returned to the clients.

Storage of information on the storage appliance 615 is, in the illustrative embodiment, implemented as one or more storage volumes that comprise a cluster of physical storage disks, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

Specifically, each volume is constructed from an array of physical disks that are organized as RAID groups. The physical disks of each RAID group include those disks configured to store striped data and parity for the data, in accordance with an illustrative RAID 4 level configuration. However, other RAID level configurations (e.g. RAID 5) are also contemplated. In the illustrative embodiment, a minimum of one parity disk and one data disk may be employed. Yet, a typical implementation may include three data and one parity disk per RAID group and at least one RAID group per volume.

To facilitate access to the disks, the storage operating system 800 implements a write-anywhere file system that logically organizes the information as a hierarchical structure of directory, file and vdisk objects (hereinafter "directories", "files" and "vdisks") on the disks. A vdisk is a special file type that is translated into an emulated disk or logical unit number (lun) as viewed by a storage are network (SAN) client. Each "on-disk" file may be implemented as set of disk blocks configured to store information, such as data, whereas the directory may be implemented as a specially formatted file in which names and links to other files and directories are stored. Vdisks are further described in U.S. Pat. No. 7,107,385, entitled STORAGE VIRTUALIZATION BY LAYERING VIRTUAL DISK OBJECTS ON A FILE SYSTEM, by Vijayan Rajan, et al. the teachings of which are hereby incorporated by reference.

C. Storage Operating System

In the illustrative embodiment, the storage operating system is the NetApp® Data ONTAP™ operating system available from Network Appliance, Inc., Sunnyvale, California that implements a Write Anywhere File Layout (WAFL™) file system. However, it is expressly contemplated that any appropriate storage operating system, including a write in-place file system, may be enhanced for use in accordance with the inventive principles described herein. As such, where the term "WAFL" is employed, it should be taken broadly to refer to any file system and/or storage operating system that is otherwise adaptable to the teachings of this invention.

As used herein, the term "storage operating system" generally refers to the computer-executable code operable on a computer that manages data access and may, in the case of a storage appliance, implement data access semantics, such as the Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 8:
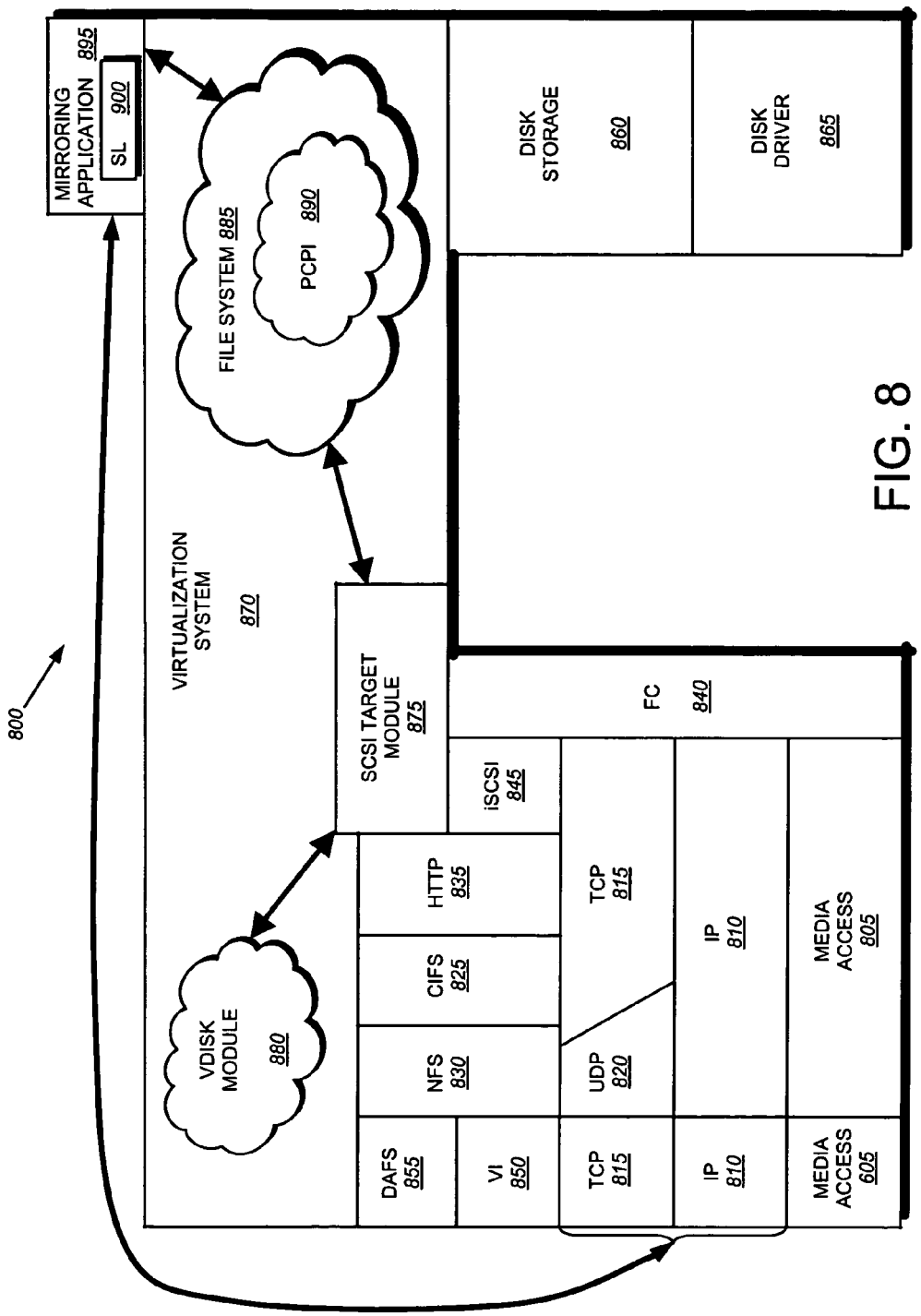
FIG. 8 is a schematic block diagram of an exemplary storage operating system in accordance with an embodiment of the present invention.

FIG. 8 is a schematic block diagram of an illustrative storage operating system 800 that may be advantageously used with the present invention. The storage operating system comprises a series of software layers organized to form an integrated network protocol stack or, more generally, a multi-protocol engine that provides data paths for clients to access information stored on the storage appliance using block and file access protocols. The protocol stack includes a media access layer 805 of network drivers (e.g., gigabit Ethernet drivers) that interfaces to network protocol layers, such as the IP layer 810 and its supporting transport mechanisms, the TCP layer 815 and the User Datagram Protocol (UDP) layer 820. A file system protocol layer provides multi-protocol file access and, to that end, includes support for the DAFS protocol 855, the NFS protocol 830, the CIFS protocol 825 and the Hypertext Transfer Protocol (HTTP) protocol 835. A virtual interface (VI layer) 850 implements the VI architecture to provide direct access transport (DAT) capabilities, such as remote direct memory access (RDMA), as required by the DAFS protocol 855.

An iSCSI driver layer 845 provides block protocol access over the TCP/IP network protocol layers, while a Fibre Channel (FC) driver layer 840 operates with the FC host bus adapter (HBA) 725 to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the storage appliance. In addition, the storage operating system includes a disk storage layer 860 that implements a disk storage protocol, such as a RAID protocol, and a disk driver layer 865 that implements a disk access protocol such as, e.g., a SCSI protocol.

Bridging the disk software layers with the integrated network protocol stack layers is a virtualization system 870 that is implemented by a file system 885 interacting with virtualization modules illustratively embodied as, e.g., vdisk module 880 and SCSI target module 875. It should be noted that the vdisk module 880, the file system and SCSI target module 875 can be implemented in software, hardware, firmware, or a combination thereof. The vdisk module 880 interacts with the file system 885 to enable access by administrative interfaces in response to a system administrator issuing commands to the multi-protocol storage appliance 615. In essence, the vdisk module 880 manages SAN deployments by, among other things, implementing a comprehensive set of vdisk (lun) commands issued through a user interface by a system administrator. These vdisk commands are converted to primitive file system operations ("primitives") that interact with the file system 885 and the SCSI target module 875 to implement the vdisks.

The SCSI target module 875, in turn, initiates emulation of a disk or lun by providing a mapping procedure that translates luns into the special vdisk file types. The SCSI target module is illustratively disposed between the FC and iSCSI drivers 840, 845 and the file system 885 to thereby provide a translation layer of the virtualization system 870 between the SAN block (lun) space and the file system space, where luns are represented as vdisks.

The file system 885 illustratively implements the WAFL file system having an on-disk format representation that is block-based using, e.g., 4 kilobyte (KB) blocks and using inodes to describe the files. The WAFL file system uses files to store metadata describing the layout of its file system; these metadata files include, among others, an inode file. A file handle, i.e., an identifier that includes an inode number, is used to retrieve an inode from disk. A description of the structure of the file system, including on-disk inodes and the inode file, is provided in U.S. Pat. No. 5,819,292, entitled METHOD FOR MAINTAINING CONSISTENT STATES OF A FILE SYSTEM AND FOR CREATING USER-ACCESSIBLE READ-ONLY COPIES OF A FILE SYSTEM, by David Hitz, et al., the contents of which are hereby incorporated by reference.

The storage operating system 800 further includes, in the illustrative embodiment, a mirroring application 895 that performs volume or qtree-based mirroring. The mirroring application 895 is illustratively integrated with the TCP 815 and IP 810 layers and a PCPI processes 890 within the file system 885. The mirroring application 895 utilizes TCP/IP for communication with the upstream and/or downstream within a cascaded chain of storage systems. The mirroring application 895 utilizes the PCPI processes 890 within the file system 885 to determine changed blocks within volumes and/or qtrees. Also stored within the storage operating system 800 is a plurality of soft lock data structures 900. The soft lock data structures, described further below, are utilized by a plurality of applications to ensure that their dependence upon or use of PCPI on local or remote storage systems.

The storage operating system 800 may include, in certain embodiments, a conventional tape backup application 897 that may transfer a PCPI to a tape device for archival and/or disaster recovery purposes. Such application 897 may perform backup operations on a set schedule or may execute only upon initialization by an administrator.

D. Soft Locks

As noted above, located within the storage operating system are a series of soft lock data structures 900 that may be associated with a given PCPI. A soft lock is a system-independent, application-generic, application-controlled and accessible mechanism for establishing references to, ownership of, or dependence upon a PCPI and wherein the dependencies can be synchronized among a plurality of systems that have an interest in the PCPI. By "interest" it is meant a dependency on the PCPI, where, for example, an application requires access to that PCPI for a specific function. It should be noted that activation of a soft lock does not guarantee that the soft locked PCPI will be preserved. In the illustrative embodiment, the file system 885 will permit delete operations to occur to a soft locked data structure, e.g., a PCPI. This is in contrast to those data structures that are "hard locked," i.e. those data structures that the file system locks against deletion. Instead of being directly integrated into particular file systems, soft locks are system-independent structures that communicate information between applications, users and systems about dependencies or relationships of PCPIs on one or more systems. Mirroring applications 895, or other processes executing within the storage operating system 800 that utilize soft locks, will not initiate a delete operation to a soft locked PCPI that other applications or processes depend upon. Thus, an administrator may delete a PCPI to, for example, free storage space on the volume that is occupied by the PCPI, but with the knowledge of the impact to the applications that depend on that PCPI. For example, with a mirror, such a deletion prevents systems that need that PCPI from updating the mirror. In the illustrative embodiment, while any application can be made soft lock owners, only those applications that are soft lock aware will respect soft locks. Thus, non-soft lock aware applications may delete a soft locked PCPI and the file system will permit such deletion.

Figure 9:
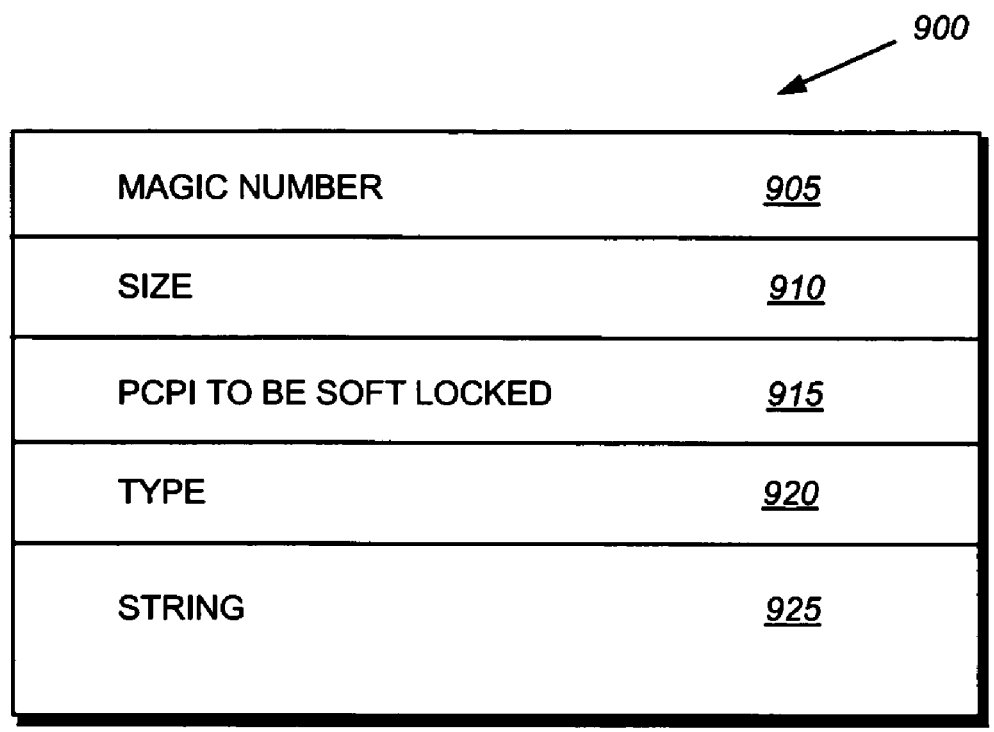
FIG. 9 is a schematic block diagram of an exemplary soft lock data structure in accordance with an embodiment of the present invention.

An exemplary soft lock data structure 900 is shown in FIG. 9. The soft lock data structure 900 includes a magic number field 905, a size field 910, an identifier of the PCPI to be soft locked 915, a type field 920 and a string field 925. It should be noted that in alternate embodiments additional and/or differing fields may be included in a soft lock data structure. It is expressly contemplated that multiple type and string fields 915 and 920 may be included in a soft lock data structure. The magic number field 905 contains a value that identifies the data structure as a soft lock. The size field 910 defines the overall length of the soft lock data structure. PCPI identifier 915 identifies which PCPI is being soft locked. The type field 920 identifies the type of information stored in the string field 925. An illustrative type is OWNERNAME, which identifies the string stored in the string field 920 as the name of the application that "owns" the soft lock. Other types may include, for example, DESTPATH, which identifies the string field 920 as containing the destination path that requires the soft lock and QTREENAME that identifies the string field 920 as containing the source qtree name. It is expressly contemplated that other types may be utilized in accordance with the principles of the present invention.

Figure 10:
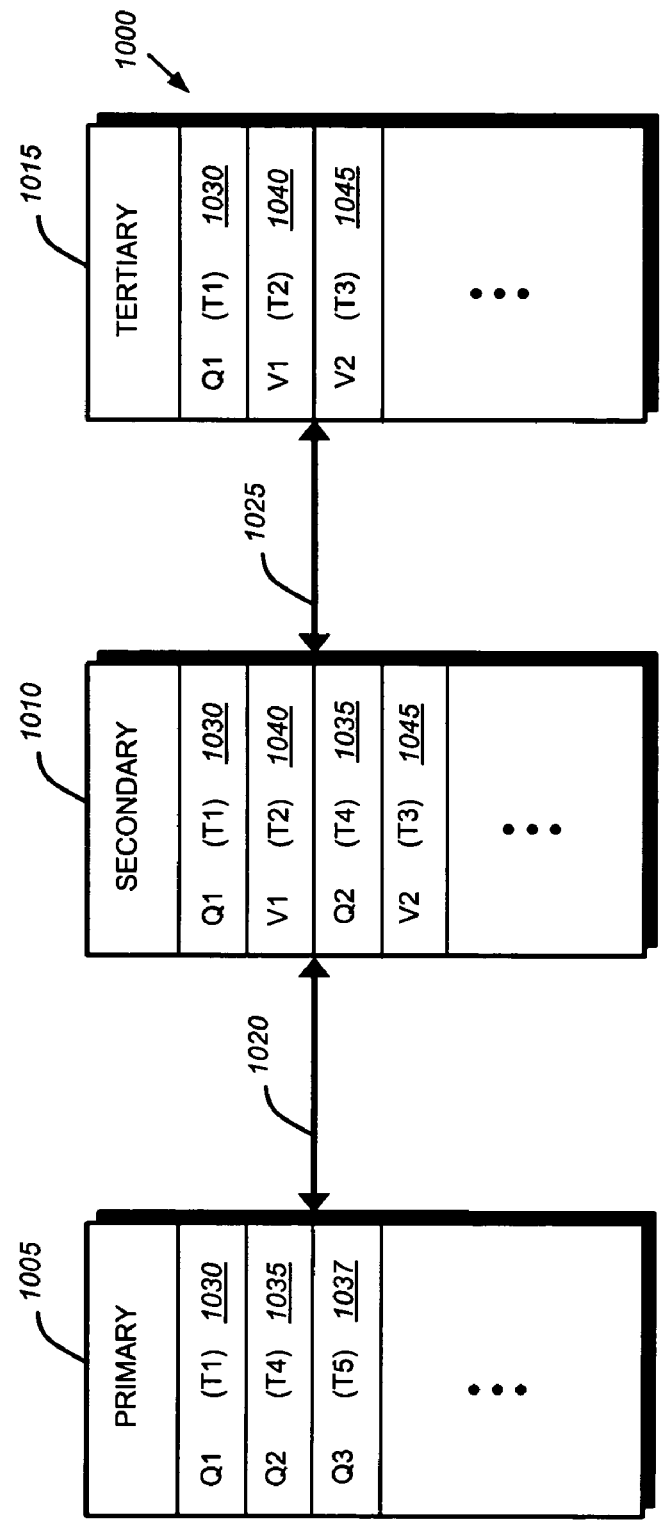
FIG. 10 is a schematic block diagram of an exemplary PCPI association map in accordance with an embodiment of the present invention.

One exemplary use of soft locks is in a cascaded mirror. With soft locks, the dependencies between downstream cascaded mirrors can be synchronized with the upstream mirrors. While the PCPIs are spread across multiple systems, the multiple independent systems and instances of the replication application can understand the dependencies upon specific PCPIs. Thus, if any system in the chain of mirrors is removed or reconfigured, any system can continue the mirror relationship, as they share all common PCPIs and soft locks. FIG. 10 is a schematic block diagram of an exemplary cascaded mirroring system showing PCPI dependencies among three mirrored systems. The environment 1000 includes a primary 1005, a secondary 1010 and a tertiary 1015 system. The primary system 1005 is connected to the secondary 1010 via data link 1020. In the illustrative embodiment, the primary system is mirrored to the secondary via data link 1020 using an asynchronous mirroring technique such as that described in the above-incorporated patent application entitled SYSTEM AND METHOD FOR DETERMINING CHANGES IN TWO SNAPSHOTS AND FOR TRANSMITTING CHANGES TO A DESTINATION SNAPSHOT. The secondary 1010 is connected to the tertiary 1015 via data link 1025. In accordance with the illustrative embodiment, the secondary is further mirrored to the tertiary 1015 via a volume based mirroring technique over data link 1025. Such a volume-based mirroring technique is described in the above-incorporated patent application entitled FILE SYSTEM IMAGE TRANSFER.

On the primary system 1005 are a series of PCPIs including PCPIs Q1 1030, Q2 1035, Q3 1037, which are generated by a qtree-based (or other sub-volume level) mirroring process. These qtree-based PCPIs are mirrored over data link 1020 to the secondary 1010, which in this illustrative system comprises PCPIs Q1 1030 and Q2 1035. Additionally, the secondary system 1010 includes PCPIs V1 1040 and V2 1045, which are generated by a volume-based mirroring process executing on the secondary 1010. These volume-based mirroring PCPIs are transferred over data link 1025 to the tertiary system 1015, which includes PCPIs Q1 1030, V1 1040 and V2 1045.

The state of PCPIs located on primary, secondary and tertiary systems shown in FIG. 10 may be achieved by, for example, the following sequence actions. The primary system 1005 executes a qtree based mirroring application that generates PCPIs Q1, Q2 and Q3 at set time intervals (times T1, T4 and T5 respectively) and mirrors them to the secondary system 1010. In this example, a volume-based mirroring application executing on the secondary system 1010 generates PCPI V1 1040, at time T2, after receiving PCPI Q1 1030 from the primary 1005. Thus, the PCPI V1 1040 is mirrored to the tertiary system 1015 resulting in the tertiary system containing PCPI Q1 1030 and V1 1040. The volume-based mirroring application executing on the secondary system identifies that PCPI Q1 1030 is required to be soft locked on the primary 1005 to insure that the primary, secondary and tertiary systems share common PCPIs. Thus, the mirroring application executing on the secondary soft locks PCPI Q1 1030 located on the secondary. When the secondary next updates its data from the primary, it will propagate the soft locks for PCPI Q1 1030 located on the primary 1005. This propagation of soft locks is described further below in reference to the exemplary flow diagram of FIG. 11.

At some later point in time (time T3), the secondary system 1010 generates PCPI V2 1045 and mirrors it to the tertiary system 1015. If, for example, PCPI Q2 1035 is generated by the primary system 1005 (at time T4) after the initialization or beginning of the mirroring for PCPI V2 1045, it will not be contained within PCPI V2 nor mirrored to tertiary system 1015. In this case, the mirroring application executing on the secondary notes that, as between the secondary and tertiary system, the most up-to-date PCPI is V2 1045. However, the soft lock for PCPI Q1 1030 is maintained as it is the most recent PCPI that the primary and tertiary system share in common. The application or mirroring application notes that as PCPI V2 1045 is more recent that PCPI V1 1040, the soft lock on V1 may be released. Since the secondary and tertiary systems share PCPI V2 1045, they may be able to resume mirroring using the common PCPI V2.

Thus, in the environment shown in FIG. 10, various PCPIs would be soft locked in accordance with the illustrative embodiment of the present invention to ensure that copies of these PCPIs are maintained on the various systems in the cascaded chain of mirrored systems so that mirroring operations may be resumed in the event of a failure of any one or more of the systems. For example, Q1 1030 would be soft locked as it is the only PCPI that is in common among all three of the systems shown in FIG. 10. PCPI Q2 1035 would also be soft locked as it is the most recent PCPI that the primary system 1005 and secondary system 1010 share for replica Q2. PCPI Q3 would not be soft locked as it is not shared in common between any of the systems in the environment—clearly it is being mirrored to a different system. PCPI V1 1040 would have been soft locked between the secondary system 1010 and tertiary system 1015 until PCPI V2 1045 was mirrored to the tertiary system. Once PCPI V2 1045 has been mirrored, it is a more-recent PCPI that is shared in common between the secondary and tertiary, thereby in accordance with the illustrative embodiment, the soft lock on PCPI V1 1040 would have been released.

Figure 11:
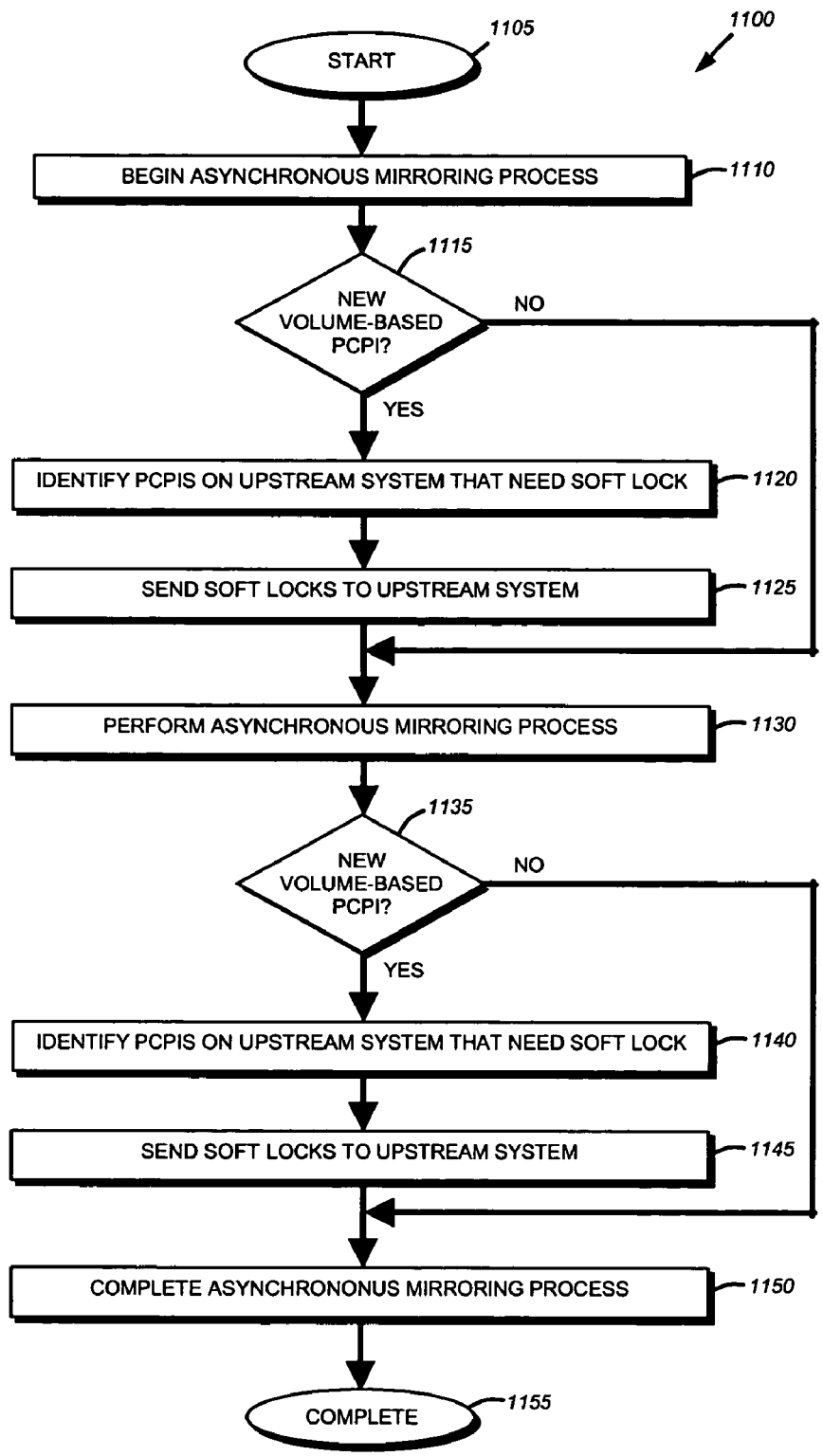
FIG. 11 is a flow chart detailing the steps of a procedure for providing soft locks in a cascaded mirrored volume environment in accordance with an embodiment of the present invention.

FIG. 11 is a flow chart detailing the steps of a procedure 1100 performed by the mirroring application 890 in accordance with an embodiment of the present invention. The procedure 1100 starts in step 1105 and, in step 1110, initiates an asynchronous mirroring transfer. This transfer may be either a qtree-based (or other sub-volume based) synchronous or asynchronous mirroring process or a volume-based synchronous or asynchronous mirroring process or, in alternate embodiments a mirroring process based upon other "data containers" including, for example a vdisk-based mirroring process. The mirroring process runs according to an established and conventional mirroring protocol including, for example, the expiration of a set time period or the initiation of the mirroring process by a user or administrator. Next, in step 1115, the procedure checks for a new volume-based PCPI on the storage system. This may be determined by examining a file system-maintained list of PCPIs to determine if a new PCPI has been generated as a result of volume-based mirroring application.

If a new volume-based PCPI is detected, the procedure continues to step 1120 and identifies those PCPIs or that are located on the upstream system that need to be soft locked. Next, in step 1125, the identified soft locks are sent to the upstream system. In alternate embodiments, actual soft lock data structures are not sent, however instead, the mirroring application transmits the required data to generate a soft lock to the mirroring application executing on the upstream storage system. Once these soft locks have been propagated to the upstream storage system, the procedure then performs the asynchronous mirroring process in step 1130. This mirroring process may be accomplished by the technique described in the above-incorporated patent application or by any other, acceptable asynchronous mirroring technique.

Once the mirroring process is ready to exit the procedure, it then checks to determine if any additional new volume-based PCPIs have been generated on the storage system. If no new volume-based PCPIs have been generated, the procedure branches to step 1150 and completes the asynchronous mirroring process. The procedure is then complete (step 1155).

Otherwise, if new volume-based PCPIs have been identified in step 1135, the procedure branches to step 1140 and identifies those PCPIs located on the upstream storage system that require a soft lock. The procedure then sends the soft locks to the upstream system in step 1145, before completing the cleanup of the process in step 1150. At that point the procedure 1100 completes 1155.

Figure 12:
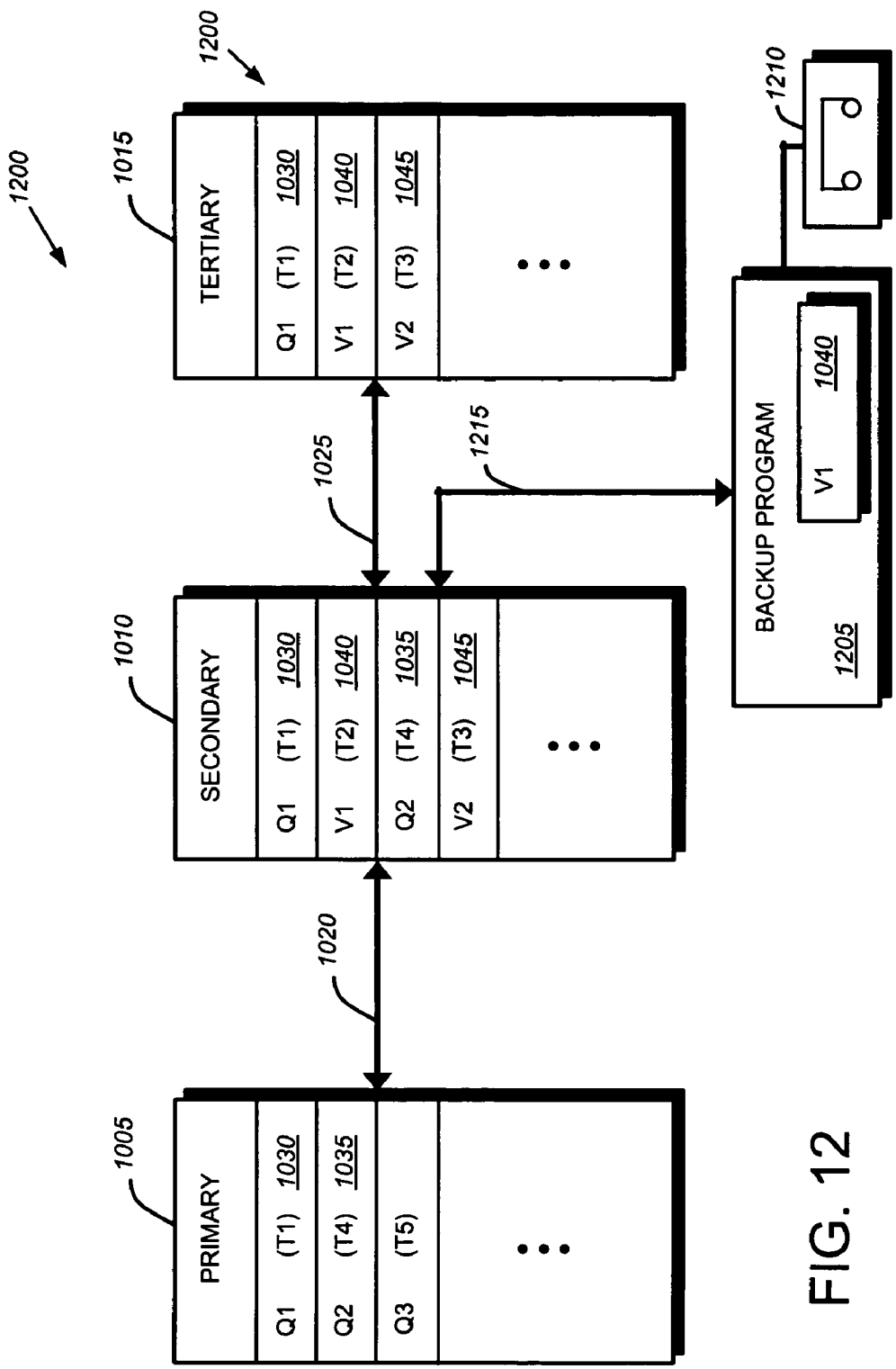
FIG. 12 is a schematic block diagram of an exemplary in accordance with an embodiment of the present invention.

FIG. 12 is a schematic block diagram of an exemplary cascaded mirroring system showing PCPI dependencies upon three mirrored systems and an illustrative tape backup program. The environment 1200 is identical to environment 1000 with the addition of a backup program 1205 transferring a specified PCPI to a tape device 1210. In this illustrative embodiment, the backup program 1205 is connected to the secondary 1010 via datalink 1215. The backup program 1205 may be executing on the secondary system (such as tape backup 897) or, in alternative embodiments, may be a backup program executing remotely from the secondary system but accessing a specified PCPI on the secondary system. The various PCPI dependencies among the three systems (primary, secondary and tertiary) are as they were in environment 1000 described above in conjunction with FIG. 10. However, in this illustrative example, the backup program 1205 is transferring PCPI V1 1040 to tape device 1210. According to an illustrative embodiment of the present invention, the backup program 1205 will create a soft lock on PCPI V1 on the secondary system to ensure that PCPI V1 is not deleted until such time as the backup program has fully transferred the PCPI to the tape device 1210. This ensures that mirroring applications will not interfere with the operation of the backup program.

To again summarize, the present invention is directed to a technique for implementing soft locks on a storage system so that applications can communicate their dependencies on a PCPI either locally on a standalone system or synchronized across a plurality of storage systems and applications. The technique, in the illustrative embodiment, checks for new PCPIs on a system at the beginning and conclusion of a mirroring process of a cascaded chain of storage systems. The technique determines that if any newly found PCPIs require the creation of a new soft lock, i.e., the newly created PCPI is a already shared in common between two or more of the systems in the cascaded chain of systems and is more recent than the currently shared PCPI. If one of the found PCPIs does require the creation of a soft lock, a soft lock data structure is created on the storage system and propagated upstream (i.e., to the storage system from which data is received). Similarly, a determination is made as to whether a PCPI is still required to be soft locked. If a PCPI no longer requires a soft lock, the soft lock is removed and the changes are propagated through the cascaded chain of systems.

The present invention also permits non-mirroring applications, such as a tape backup application, to create a soft lock on a PCPI to prevent mirroring or other applications from deleting the PCPI while the backup utility is copying the data to tape. More generally, the present invention permits various applications executing on a storage appliance to soft lock a certain PCPI within a plurality of systems.

The foregoing has been a detailed description of an illustrative embodiment of the invention. Various modifications and additions can be made without departing from the spirit and scope thereof. For example, this description can be applied to a variety of computer and/or file server arrangements connected by a variety of links. While the illustrative embodiment is written with reference to implementing soft locks in a cascaded mirror, the novel soft locks may be utilized in any environment to communicate appropriate dependencies in accordance with the principles of the present invention. Also, the teachings of this invention can be implemented in a variety of manners including hardware, software, including program instructions of a computer-readable medium executing on a computer, or a combination of hardware and software. Accordingly, this description is meant to be taken only by way of example and not to otherwise limit the scope of this invention.

What is claimed is:

1. A system for synchronizing dependencies upon a set of persistent consistency point images (PCPIs) among a set of computers, the system comprising:
    means for identifying a dependency upon the set of PCPIs;
    means for creating a set of soft locks, each soft lock in the set of soft locks associated with each of the PCPIs in the set of PCPIs; and
    means for transmitting the set of soft locks upstream to one or more of the set of computers.

2. The system of claim 1 wherein the set of computers comprises a set of storage appliances.

3. The system of claim 1 wherein each soft lock comprises a PCPI identifier field, a type field and a string field.

4. The system of claim 3 wherein the string field comprises user visible information.

5. The system of claim 3 wherein the string field identifies an application that depends upon the PCPI associated with the soft lock.

6. The system of claim 3 wherein the type field identifies a type of data in the string field.

7. The system of claim 6 wherein the type of data comprised an owner name.

8. The system of claim 6 wherein the type of data comprises a destination path.

9. The system of claim 6 wherein the type of data comprises a qtree name.

10. The system of claim 1 wherein the means for transmitting the set of soft locks to one or more of the set of computers further comprises:
    means for transmitting the set of soft locks before an asynchronous mirroring process; and
    means for transmitting the set of soft locks after an asynchronous mirroring process.

11. The system of claim 1 further comprising:
    means for transmitting the set of soft locks downstream to the one or more of the set of computers.

12. A method for synchronizing dependencies upon a set of persistent consistency point images (PCPIs) among a set of computers, comprising:
    identifying a dependency upon the set of PCPIs;
    creating a set of soft locks, each soft lock in the set of soft locks associated with each of the PCPIs in the set of PCPIs; and
    transmitting the set of soft locks upstream to one or more of the set of computers.

13. The method of claim 12 wherein the set of computers comprises a set of storage appliances.

14. The method of claim 12 wherein each soft lock comprises a PCPI identifier field, a type field and a string field.

15. The method of claim 14 wherein the string field comprises user visible information.

16. The method of claim 14 wherein the string field identifies an application that depends upon the PCPI associated with the soft lock.

17. The method of claim 14 wherein the type field identifies a type of data in the string field.

18. The method of claim 17 wherein the type of data comprises an owner name.

19. The method of claim 17 wherein the type of data comprises a destination path.

20. The method of claim 17 wherein the type of data comprises a qtree name.

21. The method of claim 12 wherein the step of transmitting the set of soft locks to one or more of the set of computers further comprises:
    transmitting the set of soft locks before an asynchronous mirroring process; and
    transmitting the set of soft locks after an asynchronous mirroring process.

22. The method of claim 12 further comprising:
    transmitting the set of soft locks downstream to the one or more of the set of computers.

23. A storage system for use in a storage system environment for communicating dependencies upon a set of persistent consistency point images (PCPIs) among a set of storage systems, the storage system comprising:
    a storage operating system having a file system that implements PCPIs;
    an application executing on the storage system, the application adapted to implement a soft lock to communicate a dependency with a specific PCPI; and
    a network protocol module of the storage operating system, the network protocol module operatively interconnected with the application and adapted to transfer the soft lock to one or more upstream storage systems in the set of storage systems.

24. The storage system of claim 23 wherein the application comprises an asynchronous mirroring application.

25. The storage system of claim 23 wherein the soft lock comprises a PCPI identifier field, a type field, and a string field.

26. The storage system of claim 25 wherein the string field comprises user visible information.

27. The method of claim 25 wherein the string field identifies an application that depends upon the PCPI associated with the soft lock.

28. The method of claim 25 wherein the type field identifies a type of data in the string field.

29. The method of claim 28 wherein the type of data comprises an owner name.

30. The method of claim 28 wherein the type of data comprises a destination path.

31. The method of claim 28 wherein the type of data comprises a qtree name.

32. The system of claim 23 wherein the network protocol module is further adapted to transfer the soft lock to one or more downstream storage systems in the set of storage systems.

33. A storage system for use in a cascaded set of storage systems having at least an upstream storage system, the storage system comprising:
   means for identifying a set of persistent consistency point images on the upstream storage system that require a soft lock to be set;
   means for creating soft locks for the identified set of persistent consistency point images; and
   means for sending the created soft locks to the upstream storage system.

34. The storage system of claim 33 further comprising means for performing an asynchronous mirroring process to mirror local data to a downstream storage system.

35. The storage system of claim 34 wherein the storage system is operatively interconnected with the downstream storage system via a network.

36. The storage system of claim 34 wherein the storage system is connected to the upstream storage system and the downstream storage system via a network.

37. The storage system of claim 33 further comprising means for performing an asynchronous mirroring process to mirror local data to the downstream storage system.

38. The method of claim 33 further comprising:
   means for identifying a separate set of persistent consistency point images on the downstream storage system that require a separate soft lock to be set;
   means for creating the separate soft locks for the identified separate set of persistent consistency point images; and
   means for sending the created separate soft locks to the downstream storage system.

39. A computer readable medium, including program instructions executing on a storage system in a cascaded set of storage systems having at least an upstream storage system and a downstream storage system, the computer readable medium including instructions for performing the steps of:
   identifying a set of persistent consistency point images that are in common between the upstream storage system and the downstream storage system; and
   identifying a set of persistent consistency point images that have a soft lock set from one or more storage systems located downstream from the downstream storage system;
   creating soft locks for the identified set of persistent consistency point images;
   sending the created soft locks to the upstream storage system; and
   performing an asynchronous mirroring process to mirror local data to the down-stream storage system.

40. The computer readable medium of claim 20 wherein local data comprises data stored on storage devices associated with a storage system executing the computer readable medium.

41. A method for synchronizing persistent consistency point images among a plurality of computers, comprising:
   identifying a set of persistent consistency point images on a first computer of the plurality of computers;
   creating soft locks for the identified set of persistent consistency point images; and
   sending the created soft locks upstream to the plurality of computers.

42. The method of claim 41 wherein, in the identifying step, the set of persistent consistency point images is identified, in the identifying step, on an upstream storage system of the plurality of computers.

43. The method of claim 41 wherein, in the sending step, the created soft locks are sent, to an upstream storage system of the plurality of computers.

44. The method of claim 41 wherein, in the identifying step, persistent consistency point images that require a soft lock to be set are identified.

45. The method of claim 41 further comprising:
   performing an asynchronous mirroring process to mirror local data to a selected computer of the plurality of computers, the soft locks maintaining consistency of the data on the plurality of computers.

46. The method of claim 45 wherein, in the mirroring step, the local data is mirrored to a down stream storage system of the plurality of computers.

47. The method of claim 41 further comprising:
   sending the created soft locks downstream to the plurality of computers.

48. A method of synchronizing dependencies upon a set of persistent consistency point images, comprising:
   identifying a set of persistent consistency point images that are in common between an upstream storage system and a downstream storage system; and
   identifying a set of persistent consistency point images that have a soft lock set from one or more storage systems located downstream from the downstream storage system;
   creating soft locks for the identified set of persistent consistency point images; and
   sending the created soft locks to the upstream storage system.

49. The method of claim 48 further comprising:
   performing an asynchronous mirroring process to mirror local data to the down-stream storage system.

50. The method of claim 48 further comprising:
   sending the created soft locks to the downstream storage system.

51. A system for synchronizing dependencies upon a set of persistent consistency point images, comprising:
   means for identifying a set of persistent consistency point images that are in common between an upstream storage system and a downstream storage system; and
   means for identifying a set of persistent consistency point images that have a soft lock set from one or more storage systems located downstream from the downstream storage system;
   means for creating soft locks for the identified set of persistent consistency point images; and
   means for sending the created soft locks to the upstream storage system.

52. The system according to claim 51 further comprising:
   means for performing an asynchronous mirroring process to mirror local data to the downstream storage system.

53. The system of claim 51 further comprising:
   means for sending the created soft locks to the downstream storage system.

* * * * *